(12) United States Patent
Stelter et al.

(10) Patent No.: US 6,690,785 B1
(45) Date of Patent: Feb. 10, 2004

(54) SYSTEM AND METHOD FOR PROVIDING CALLED PARTY INFORMATION FOR CENTRALIZED TELEPHONE SERVICE

(75) Inventors: Ronald Durkson Stelter, San Ramon, CA (US); Wendell Brown, Las Vegas, NV (US)

(73) Assignee: America Online, Inc., Dulles, VA (US)

( * ) Notice: Subject to any disclaimer, the term of this patent is extended or adjusted under 35 U.S.C. 154(b) by 478 days.

(21) Appl. No.: 09/818,390

(22) Filed: Mar. 27, 2001

Related U.S. Application Data

(60) Provisional application No. 60/196,755, filed on Apr. 12, 2000.

(51) Int. Cl.[7] .......................... H04M 3/42; H04M 1/64; H04M 7/00
(52) U.S. Cl. ................ 379/211.02; 379/88.25; 379/220.01
(58) Field of Search ................ 379/211.02, 219, 379/220.01, 221.01, 221.08, 221.13, 88.25, 88.27, 67.1, 229

(56) References Cited

U.S. PATENT DOCUMENTS

| | | | | |
|---|---|---|---|---|
| 5,384,829 A | * | 1/1995 | Heileman, Jr. et al. | 379/88.26 |
| 6,301,349 B1 | * | 10/2001 | Malik | 379/211.02 |
| 6,393,122 B1 | * | 5/2002 | Belzile | 379/258 |
| 6,427,010 B1 | * | 7/2002 | Farris et al. | 379/221.13 |

* cited by examiner

*Primary Examiner*—Benny Tieu
(74) *Attorney, Agent, or Firm*—Glenn Patent Group; Michael A. Glenn

(57) ABSTRACT

A system and method are provided for forwarding information regarding a called party to a third party, for a call originated from a calling party to the called party. The information may comprise a telephone number of the called party and the call may be forwarded along with the information, so that the third party can provide a telephone service (e.g., centralized voice mail). At a telephone switch coupled to the third party, the forwarded call is received with the identifying information via a first signaling protocol (e.g., SS7). A second signaling protocol (e.g., SMDI, ISDN PRI) is used between the switch and the third party. The identifying information is retrieved from one field of the first protocol and stored in a different field of the second protocol.

24 Claims, 3 Drawing Sheets

SYSTEM AND METHOD FOR PROVIDING CALLED PARTY INFORMATION FOR CENTRALIZED TELEPHONE SERVICE

This application claims the benefit of provisional application No. 60/196,755, filed Apr. 12, 2000.

BACKGROUND

This invention relates to the field of telecommunications. More particularly, a system and methods are provided for identifying and propagating called-party information through a telephone network for use in a centralized voice mail service.

A central or network voice mail provider (VMP) offers voice mail services to subscribers by receiving, at a central location, voice mail messages directed to those subscribers. Receiving and storing the messages at a central location eliminates any need for the subscribers to maintain their own telephone answering devices. Typically, when a calling party calls a called party who is a subscriber to a central voice mail service, if the subscriber does not answer his or her telephone the call is forwarded to the VMP. The VMP then records and stores a voice mail message from the calling party. The subscriber can then connect to the VMP and retrieve the message at a later time.

As one example of how central voice mail services have been provided, a local telephone company or Local Exchange Carrier (LEC) (or an entity connected to the telephone company's or LEC's switch) may be configured to provide voice mail services within the LEC's area, or possibly throughout its LATA (Local Access and Transport Area). The LEC generally cannot, however, provide voice mail service to a subscriber that is not connected to its switch. Thus, to provide central voice mail services regionally or nationally (i.e., across multiple local areas), a VMP could establish a presence in each local area (e.g., by configuring call servers connected to every local switch), but this would entail great expense.

Instead of establishing a presence in each local area, a voice mail provider could establish a central regional or national presence and have subscribers' calls forwarded to and handled at the central location. In this scenario, however, the subscribers that are not local to the central location could incur long-distance charges for each call forwarded to the VMP (for recording), and when accessing the system to retrieve messages. Thus, in order to establish a central voice mail service on a regional or national basis, existing systems either require a VMP's presence in every subscriber's area or lead to long-distance charges.

Further, with a central voice mail system, in order to ensure that messages are recorded for the correct parties, the system must be able to identify the target subscriber of each call it handles. This is usually done by assigning an additional telephone number to a subscriber (i.e., a forward-to number) that can be associated with the subscriber when a call is received at that number at the VMP. Because of the scarcity of telephone numbers in some areas, however, it may not be possible to obtain another number (especially a local number) for each voice mail subscriber.

Therefore, it would be helpful to be able to identify a called subscriber through the telephone signaling information received with a call. For example, telephone signaling data may, depending on the signaling protocol or switching system, include information such as caller identification, ANI (Automatic Number Identification), DNIS (Dialed Number Identification Service), etc. However, some information that may be used by a VMP to identify a subscriber (e.g., the subscriber's telephone number) is often omitted or dropped from the signaling (e.g., when the call is transferred from one switch to another).

For example, Direct Inward Dialing (DID) is a service offered by LECs that enables one attempted solution to the desire for a centralized voice mail system. However, this solution suffers from the problems identified above, in that it requires a separate forward-to telephone number for each subscriber and the subscriber may incur long distance charges if the forward-to number is not local. With DID, when a call to a subscriber is forwarded to a voice mail provider, the subscriber's actual telephone number (i.e., the OCN or Original Called Number) is not sent in the signaling information that accompanies the forwarded call. The VMP can therefore only identify the called subscriber by the forward-to number. If one central (forward-to) number were used for multiple subscribers, the VMP would not be able to distinguish a call for one of the subscribers from a call for another.

Thus, with existing centralized voice mail systems, voice mail providers must establish a presence in each subscriber's local area, or at least every area to which subscriber's telephone calls are forwarded. But, the scarcity of telephone numbers in some areas may prevent some would-be subscribers from receiving local forward-to numbers. Existing voice mail systems cannot provide centralized services on large (e.g., regional or national) basis because users are generally unwilling to accept the long-distance charges that may be incurred when calls to them are forwarded to a VMP presence outside of their local area. In addition, using one forward-to number for multiple voice mail subscribers is not feasible when calls are forwarded long distances, because some telephone switching systems do not forward the information needed to identify a called subscriber.

SUMMARY

Therefore, in one embodiment of the invention a system and methods are provided for enabling centralized voice mail services over a large area (e.g., regionally or nationally) without assigning additional telephone numbers for each subscriber. In this embodiment, a central VMP is provided with called party information in order to identify a called subscriber even if the telephone signaling system normally does not forward this information.

In an embodiment of the invention, a telephone call originated from a calling party to a called party is received at a telephone switch coupled to a third party (e.g., a provider of telephone services, such as voice mail) because the called party's telephone service is configured to forward the call to the third party. At the switch, information concerning the called party is retrieved from a first set of call data that is configured according to a first telephone signaling protocol (e.g., Signaling System 7). A second set of call data is assembled for transmission to the third party according to another telephone signaling protocol (e.g., SMDI, ISDN PRI). In this embodiment, this other telephone signaling protocol normally excludes the called party information or, alternatively, includes a field that is configured to store data for identifying the called party, but that field of data is not received at the switch through the first protocol.

The called party information is stored in the second set of call data in place of other information and the call data is transmitted to the third party with the forwarded call. The third party can then use the information to identify the called party for purposes of recording a voice mail message, playing a greeting for the calling party from the called party, billing the called party, or for some other reason.

DETAILED DESCRIPTION

Figure 1:
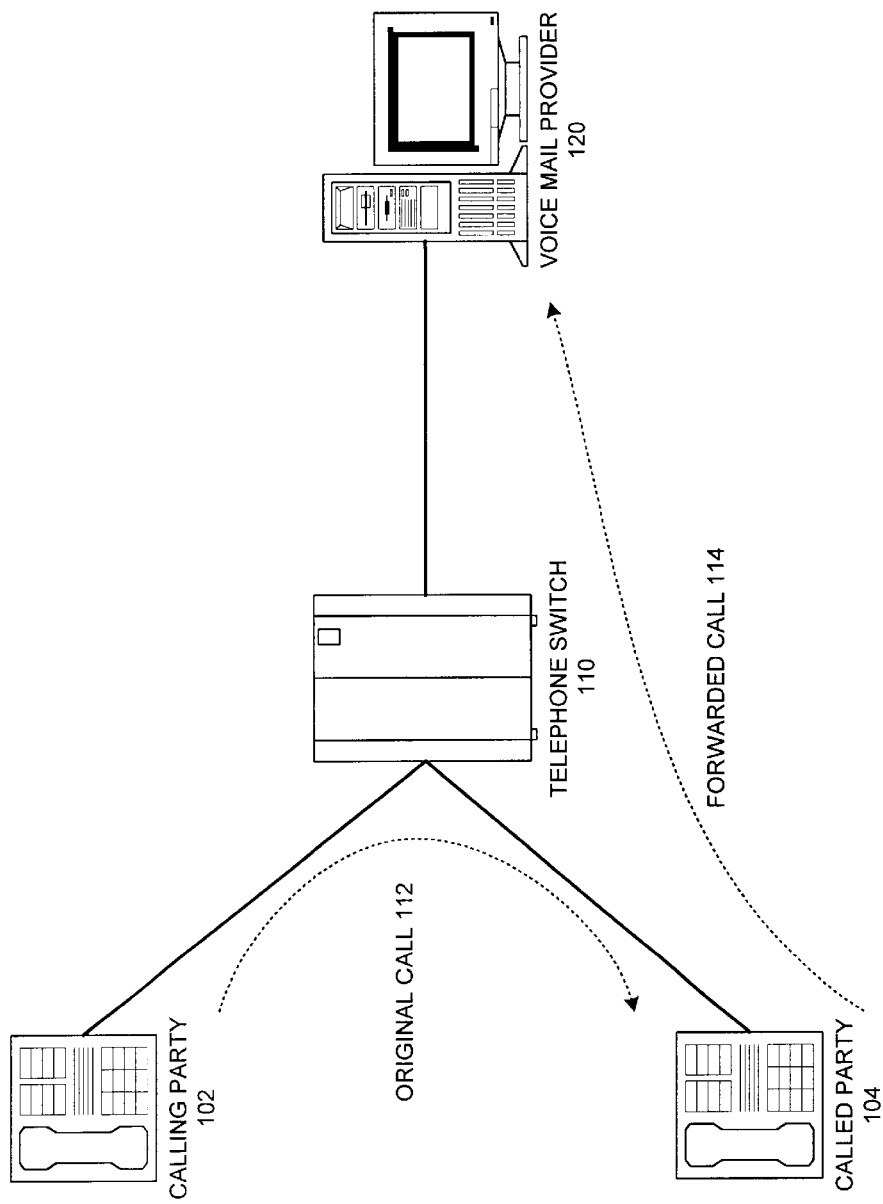
FIG. 1 is a block diagram depicting a telephone switching system for facilitating voice mail service in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

It should be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention, a system and methods are provided for passing, to a third party, information regarding a telephone call placed to a called party. More particularly, the information comprises data that may be used to identify the called party (e.g., a telephone number). Illustratively, the third party may need to identify the called party in order to provide a telephone service or to bill for a service.

One particular implementation of this embodiment may be configured for a communication environment in which a call placed to a called party is forwarded to a third party that provides enhanced telephone services—such as centralized voice mail. In accordance with this embodiment, when a call is forwarded to the enhanced telephone service provider, if certain call data is not normally sent with the call (e.g., in the accompanying signaling), that data is mapped into and may replace other call data that is normally sent. In particular, in this embodiment of the invention the OCN (Original Called Number), RDN (Redirected Number) or other information that can identify the called party is inserted into the call data, possibly in place of different data (e.g., the CallerID field).

However, in other embodiments, other fields of a call record could be displaced. The identifying information may, in one alternative embodiment, be placed in a data field that is configured for such information but which is normally not used because the information is normally not available. This may occur, for example, when a call is transferred from one signaling system (e.g., SS7) into another (e.g., ISDN PRI (Integrated Services Digital Network, Primary Rate Interface)).

When the call is received at the enhanced telephone service provider, that entity may then receive and use the inserted data as necessary—such as to identify the called party so that the appropriate recipient of a voice mail message can be identified, so that a greeting from the called party can be played for the caller, etc.

FIG. 1 depicts a local communication environment in which an enhanced telephone service entity—in this case a voice mail provider (VMP)—receives calls placed to, and subsequently forwarded from, service subscribers. For example, a called party's telephone service may be configured to forward calls to the VMP if the subscriber's line is busy, there is no answer or the subscriber has requested all calls be forwarded (e.g., using a local telephone service such as *72, or other forms of forwarding—such as delayed-call-forwarding).

In FIG. 1, calling party 102 places a call to called party 104 through local telephone switch 110. Switch 110 may be operated by a local telephone company or LEC (Local Exchange Carrier). As one alternative, switch 110 may be a wireless switch operated by a wireless carrier. Because the called party's telephone service is configured to forward calls (i.e., to a forward-to number handled by VMP 120), original call 112 is forwarded to the VMP as forwarded call 114. Based on the forward-to number, VMP 120 can identify the called party and record a voice mail message for the called party. In the call data that accompanies forwarded call 114 from switch 110 to VMP 120, the forward-to number may be sent in a DNIS (Dialed Number Identification Service) data field.

Alternatively, if the connection between switch 110 and VMP 120 uses a suitable signaling protocol, such as SMDI (Simplified Message Desk Interface) or ISDN PRI, the called party's number (OCN) may be included in the call data sent to the VMP and may be used to identify the called party. In this example, the called party's number may be sent as an RDN, which represents the last number from which a telephone call was received. In contrast, an OCN is always the number of the original called party, regardless of how many times the call was subsequently forwarded. As one of skill in the art will appreciate, however, some call data (e.g., OCN or RDN) may be lost when a call is forwarded through multiple switches, and some signaling protocols may not even be configured to carry such data.

FIG. 1 thus demonstrates one system for providing voice mail service in which the VMP is local to the called party (e.g., within the same area code or LATA (Local Access and Transport Area)). In order for VMP 120 of FIG. 1 to provide voice mail services to a larger number of subscribers (e.g., regionally or nationally) using the same type of communication environment, the VMP would have to establish a presence in each local area. In addition, each subscriber would need a local forward-to number in order to avoid long-distance charges.

Figure 2:
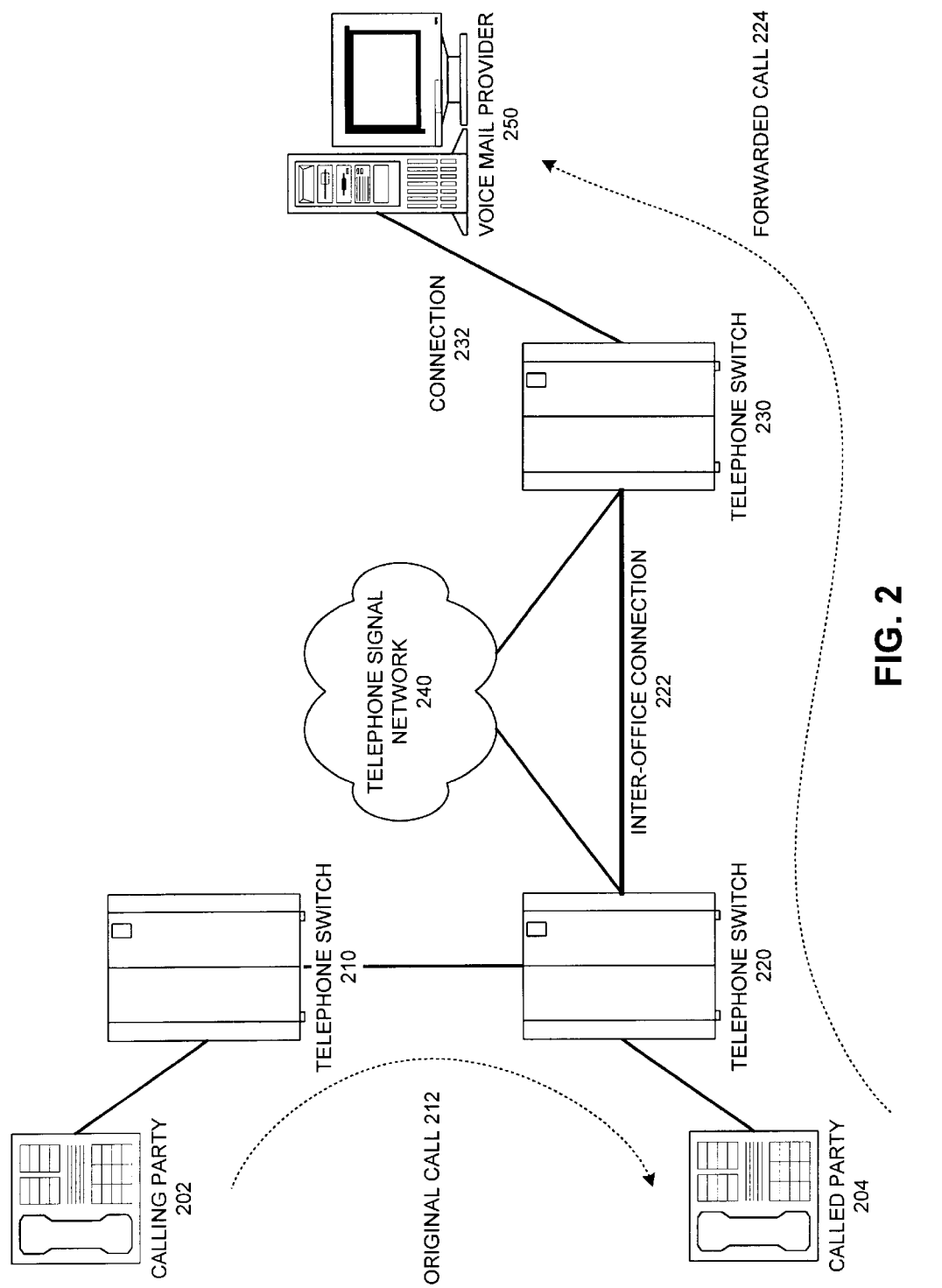
FIG. 2 depicts the switching of a call directed to a voice mail subscriber, from the subscriber's telephone to a central voice mail provider in accordance with an embodiment of the invention.

FIG. 2 depicts a communication environment in which a voice mail provider may provide voice mail services on a larger scale (e.g., regionally, nationally) without establishing a presence in each local area, according to one embodiment of the invention.

In embodiment illustrated in FIG. 2, calling party 202 initiates original call 212 to called party 204 through the calling party's local switch 210. The original call is received at switch 220, which identifies called party 204 via the OCN, DNIS or other signaling data. Because the called party does not answer, or the line is busy, or for some other reason, the call is forwarded from switch 220 to a forward-to number answered at VMP 250 as forwarded call 224.

Illustratively, the forward-to number in this embodiment of the invention is a central number assigned to multiple different voice mail subscribers. Thus, separate forward-to numbers need not be assigned to every subscriber, thereby avoiding the problem of scarce numbers. This central number may or may not be the same number the subscribers call to retrieve messages. Note that even though a central number is used in this embodiment to receive calls for multiple subscribers, VMP 250 may comprise multiple physical sites, call servers, voice response units (VRU), etc., and calls forwarded to the VMP may be distributed among the sites for load balancing, to reduce long-distance charges, or for other reasons.

The forward-to number may be a toll-free number, in which case the voice mail provider may be responsible for the long-distances charges incurred when a voice mail message is left for a subscriber and/or when the subscriber accesses the system to retrieve the message. Alternatively, the forward-to number may be some other type of number for which the VMP may be billed, such as a number having a prefix of 555. And, the same seven digit, forward-to number may be used in different area codes in order to group subscribers into different regions. As another alternative, if the subscriber is willing to incur long-distance charges, the forward-to number may be virtually any number.

Because VMP 250 in this example is not local to called party 204, switch 220 sends forwarded call 224 to switch 230, which serves the VMP, over long distance or high capacity connection 222 (e.g., an inter-office trunk). Although the call (e.g., the voice connection) may be passed via connection 222, data associated with the call may be sent via a different route—through a signaling network 240, such as Signaling System 7 (SS7). In the illustrated environment, the call data sent through network 240 may include caller identification (i.e., the calling party's number), DNIS (i.e., the forward-to number) and data that may identify the called party (e.g., OCN and/or RDN), but the latter is often dropped or otherwise lost during propagation of the signaling between switches or in signal transfers from one system or protocol to another.

Thus, in the illustrated embodiment of the invention, signaling network 240 may not carry the information needed to identify the called party (e.g., the called party's number dialed by the calling party) in a form or field recognized by switch 230 (e.g., as OCN or RDN). Thus, in this particular embodiment the desired information may be derived from another field of the signaling protocol. In particular, the SS7 protocol includes a field named ANISP (Automatic Number Identification Signaling Point), which identifies the last station or destination that a call came from. Thus, in the call pattern of FIG. 2, switch 220 populates the ANISP field of the call data passed to switch 230, for forwarded call 224, with the telephone number of called party 204. In another embodiment, the called party information is retrieved from the CEN field of the SS7 data.

However, the signaling from switch 230 to VMP 250 typically does not include the ANISP field received through SS7. In particular, if connection 232 between switch 230 and the VMP uses SMDI, ISDN PRI, or a similar protocol, the ANISP data is omitted because connection 232 is configured for a different class of signaling (e.g., customer class) than the connection between switches 220 and 230 (e.g., carrier class). Less information is carried in customer class signaling than in carrier class.

The call data carried over connection 232 is, however, configured to include other fields. In particular, in this embodiment caller identification data (i.e., the calling party's number) is normally included in the signaling. Therefore, in one implementation of this embodiment, the ANISP data received at switch 230 via SS7 for forwarded call 224 is placed into the caller identification field for deliver to VMP 250.

In one alternative embodiment, if the signaling protocol employed between switch 230 and the VMP includes an OCN or RDN field, the information identifying the called party may be mapped into one or both of them.

When received at VMP 250, the call server, switch or other equipment receiving the call is configured to extract the called party's number from the caller identification or other field. It may then be used to identify the called party, play a greeting from the called party, record a voice mail message, etc.

In one embodiment of the invention, not all calls forwarded to VMP 250 from voice mail subscribers may need to have call data mapped or transferred in this fashion. Illustratively, this may only be necessary for calls forwarded to a particular toll-free or other central number. Other forwarded calls (e.g., to numbers associated with single subscribers) may, for example, be passed through without any re-mapping, in which case the DNIS is enough to identify the subscriber. At the VMP, then, the DNIS could be examined to determine if the call is going to a common/shared number, in which case the VMP (e.g., a call server) retrieves the called party's number (e.g., OCN) from the appropriate field, as discussed above.

In other implementations of this embodiment, or in embodiments of the invention configured for other telephone signaling protocols, the called party's number may be carried in a field other than ANISP from switch 220 to switch 230. Further, any number of switches or other telecommunication entities may be interposed between the called party and the voice mail provider or between any other two entities depicted in FIG. 2.

Figure 3:
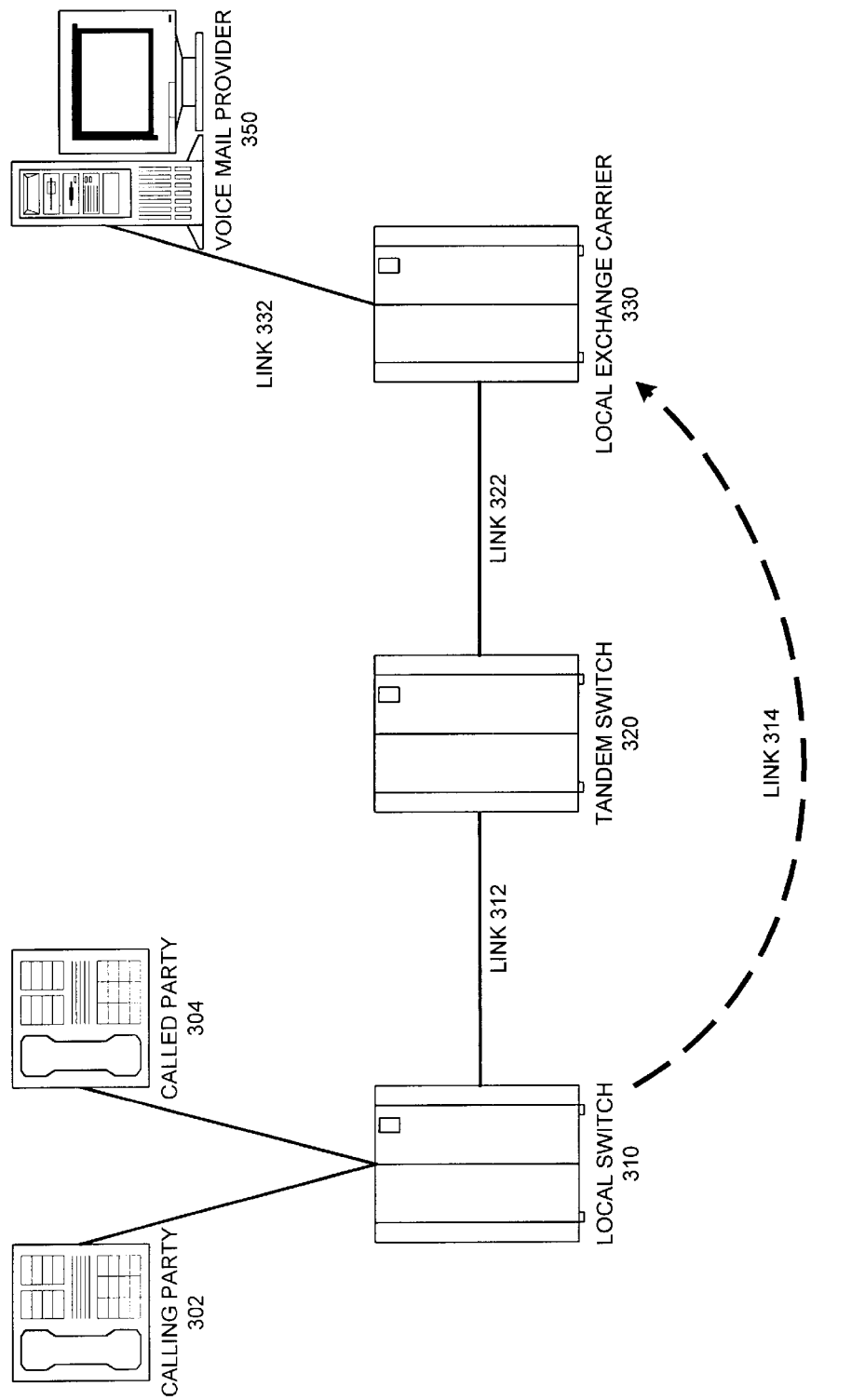
FIG. 3 depicts a telephone communication environment configured to pass called party information to a central voice mail provider in accordance with an embodiment of the invention.

FIG. 3 depicts another communication environment in which an embodiment of the invention may be implemented. In this embodiment a call from calling party 302 to called party 304 is initiated through local telephone switch 310, which is operated by a local telephone company, wireless telephone service provider or other entity. This entity may also operate tandem switch 320, which is coupled to local switch 310 via link 312. Illustratively, link 312 is a signal path that uses SS7 or other suitable signaling system. Because the called party's telephone service is configured for call forwarding to voice mail provider 350, the call is directed from local switch 310, through tandem switch 320 and signal link 322, to local exchange carrier (LEC) or other telephone service provider 330. In another implementation of the illustrated embodiment, the call may be passed from switch 310 to switch 330 via a high capacity signal path 314.

When the called was forwarded from switch 310, the called party's telephone number (e.g., the OCN) is stored in a suitable field of the call data, such as the ANISP field or some other suitable billing field. At LEC 330, the field in which the called party's number was placed is translated or mapped into the caller identification or other field of the call data to be propagated to VMP 250. LEC 330 and voice mail provider 350 are linked via signal path 332, which may be an ISDN PRI link. At VMP 350, the called party's number is extracted and used to identify the called party for purposes of recording a voice mail message or providing some other enhanced telephone service.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of providing call data to a third party, for a call originated from a calling party to a called party, comprising:

receiving a telephone call at a telephone switch coupled to the third party;

retrieving information concerning the called party from a first set of call data received at said switch, wherein the first set of call data is configured according to a first telephone signaling protocol;

assembling a second set of call data for transmission to the third party, wherein said second set of call data is configured according to a second telephone signaling protocol that normally excludes said called party information;

including said called party information in said second set of call data in place of other information; and forwarding said second set of call data to the third party.

2. The method of claim 1, wherein said telephone call is received at the telephone switch for forwarding to the third party; and said forwarding comprises forwarding the telephone call to the third party.

3. The method of claim 1, further comprising forwarding the telephone call to a forward-to number associated with the third party.

4. The method of claim 3, wherein said forward-to number is one of a toll-free number and a long-distance number from the called party.

5. The method of claim 1, wherein said called party information comprises a telephone number of the called party.

6. The method of claim 1, wherein said including comprises:

identifying a field of said second set of call data that is not configured to store said called party information; and storing said called party information in said identified field.

7. The method of claim 6, wherein said field is configured to store a telephone number of the calling party, and said called party information comprises a telephone number of the called party.

8. The method of claim 6, wherein said field is a caller identification field configured to identify the calling party.

9. The method of claim 1, wherein said including comprises storing said called party information in a field of said second set of call data that is not included in the first set of call data.

10. The method of claim 1, wherein said retrieving comprises extracting a telephone number of the called party from said first set of call data.

11. A method of identifying a telephone service subscriber to a third party to which a call originated to the subscriber is forwarded, comprising:

receiving at a first telephone switch a call originated from a calling party to a first subscriber, for forwarding to a forward-to telephone number associated with a third party, wherein said forward-to telephone number receives calls forwarded from multiple subscribers;

forwarding the call, according to a first signaling protocol, from the first switch to a second switch coupled to the third party, wherein the first signaling protocol includes data identifying the first subscriber;

at the second switch:

retrieving said identifying data;

preparing the call for forwarding to the third party according to a second signaling protocol configured to omit said identifying data;

storing said identifying data in said second signaling protocol in place of other information; and forwarding the call to the third party.

12. The method of claim 1, wherein said storing comprises placing said identifying data in a field of said second signaling protocol that is not included in the first signaling protocol.

13. The method of claim 11, wherein said forward-to number is a toll-free number.

14. The method of claim 11, wherein said forward-to number is a long-distance number from the first subscriber.

15. A method of receiving information concerning a called telephone subscriber with a call forwarded from the called subscriber, comprising:

receiving a call forwarded from a telephone service subscriber, through a first telephone switch, according to a first telephone signaling protocol;

retrieving said identifying information from a field of call data accompanying the call, wherein the field is configured to store information other than said identifying information; and using said identifying information to provide a telephone service to the called party;

wherein the call was received at the first switch according to a second telephone signaling protocol configured to include said identifying information and the other information; and wherein said identifying information is stored in place of the other information at the first switch.

16. The method of claim 15, where said identifying information is a telephone number of the telephone service subscriber.

17. The method of claim 15, wherein the other information is a telephone number of a calling party that originated the call to the telephone service subscriber.

18. The method of claim 15, wherein the first telephone signaling protocol is Integrated Services Digital Network, Primary Rate Interface.

19. The method of claim 15, wherein the first telephone signaling protocol is Simplified Message Desk Interface.

20. The method of claim 15, wherein the second telephone signaling protocol is Signaling System 7.

21. The method of claim 15, wherein said telephone service is voice mail, and said identifying information is used to identify the telephone service subscriber from a set of telephone service subscribers.

22. A computer readable storage medium storing instructions that, when executed by a computer, cause the computer to perform a method of providing call data to a third party, for a call originated from a calling party to a called party, the method comprising:

receiving a telephone call at a telephone switch coupled to the third party;

retrieving information concerning the called party from a first set of call data received at said switch, wherein the first set of call data is configured according to a first telephone signaling protocol;

assembling a second set of call data for transmission to the third party, wherein said second set of call data is configured according to a second telephone signaling protocol that normally excludes said called party information;

including said called party information in said second set of call data in place of other information; and forwarding said second set of call data to the third party.

23. A system for identifying a called party to a telephone service provider, comprising:

a first switch configured to receive a call forwarded from the called party, wherein the call is received according to a first signaling protocol configured to include information identifying the called party; and a communication link coupling the first switch to the telephone service provider, wherein data concerning the call is forwarded to the telephone service provider over the communication link according to a second signaling protocol configured to omit said identifying information;

wherein said first switch is configured to replace other information in said second signaling protocol with said identifying information.

24. The system of claim 23, further comprising a second switch configured to forward the call to said first switch according to the first signaling protocol.

* * * * *